United States Patent
Brabender

(10) Patent No.: US 10,372,616 B2
(45) Date of Patent: Aug. 6, 2019

(54) MICROCONTROLLER PERFORMING ADDRESS TRANSLATIONS USING ADDRESS OFFSETS IN MEMORY WHERE SELECTED ABSOLUTE ADDRESSING BASED PROGRAMS ARE STORED

(71) Applicant: Renesas Electronics America Inc., Santa Clara, CA (US)

(72) Inventor: Jon Matthew Brabender, Cary, NC (US)

(73) Assignee: RENESAS ELECTRONICS AMERICA INC., Santa Clara, CA (US)

( * ) Notice: Subject to any disclaimer, the term of this patent is extended or adjusted under 35 U.S.C. 154(b) by 365 days.

(21) Appl. No.: 14/729,120

(22) Filed: Jun. 3, 2015

(65) Prior Publication Data

US 2016/0357564 A1 Dec. 8, 2016

(51) Int. Cl.
*G06F 9/32* (2018.01)
*G06F 12/10* (2016.01)
*G06F 9/445* (2018.01)

(52) U.S. Cl.
CPC .............. *G06F 12/10* (2013.01); *G06F 9/32* (2013.01); *G06F 9/445* (2013.01)

(58) Field of Classification Search
CPC .................................. G06F 9/32; G06F 9/322
See application file for complete search history.

(56) References Cited

U.S. PATENT DOCUMENTS

| | | | | |
|---|---|---|---|---|
| 6,625,809 | B1 | 9/2003 | Duff | 717/169 |
| 8,281,083 | B2* | 10/2012 | Naveh | G06F 1/3203 711/154 |
| 8,621,238 | B1* | 12/2013 | Kimball | G06F 21/51 711/100 |
| 2002/0062479 | A1 | 5/2002 | Takata | 717/168 |
| 2005/0015582 | A1* | 1/2005 | Shida | G06F 9/4403 713/2 |
| 2009/0265691 | A1* | 10/2009 | Varadarajulu | G06F 11/3419 717/127 |
| 2010/0161950 | A1* | 6/2010 | Caprioli | G06F 9/324 712/234 |
| 2012/0131309 | A1 | 5/2012 | Johnson et al. | 712/41 |
| 2012/0204067 | A1* | 8/2012 | Matei | G06F 11/142 714/47.1 |
| 2015/0032996 | A1 | 1/2015 | Koeberl et al. | 712/205 |

* cited by examiner

*Primary Examiner* — Jacob Petranek
(74) *Attorney, Agent, or Firm* — Foley & Lardner LLP

(57) ABSTRACT

A method and apparatus for microcontroller (MCU) memory relocation. The MCU includes a central processing unit (CPU) and memory, but lacks a memory management unit (MMU). In one embodiment of the method, a first program is selected for execution by the CPU. The first program is one of a plurality of programs stored in the memory of the MCU. Each of the programs includes position dependent instructions. The programs are compiled from source code written in position dependent code.

3 Claims, 4 Drawing Sheets

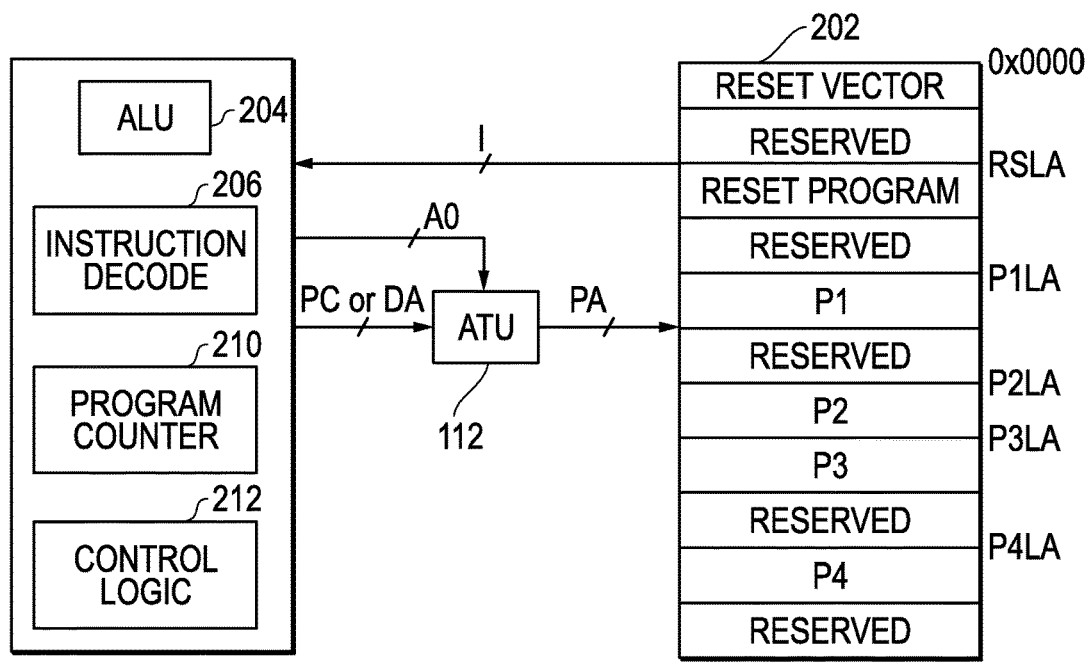
FIG. 2
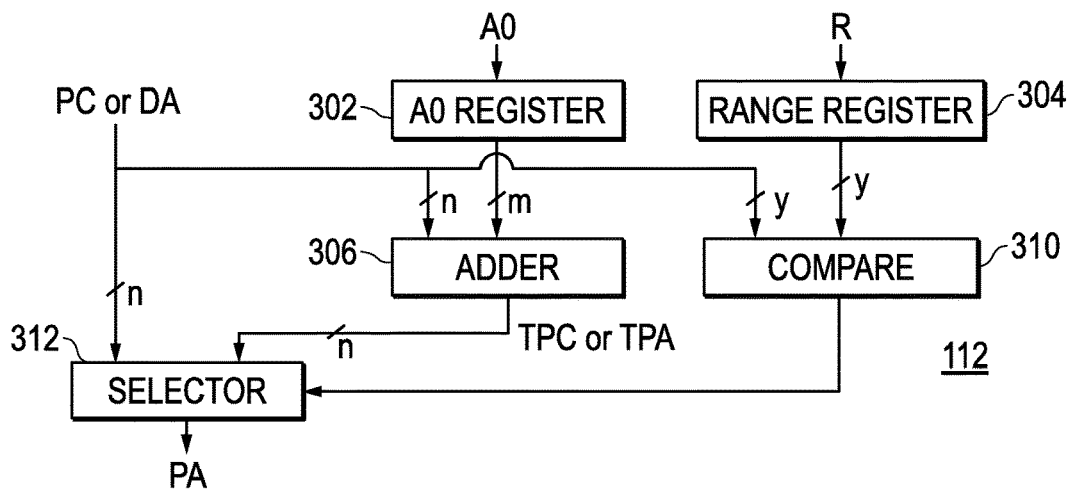
FIG. 3
| PROGRAM | A0 |
|---|---|
| P1 | A01 |
| P2 | A02 |
| P3 | A03 |
| P4 | A04 |
FIG. 5

MICROCONTROLLER PERFORMING ADDRESS TRANSLATIONS USING ADDRESS OFFSETS IN MEMORY WHERE SELECTED ABSOLUTE ADDRESSING BASED PROGRAMS ARE STORED

BACKGROUND OF THE INVENTION

A Microcontroller unit (MCU) is small computer formed on an integrated circuit. MCUs provide embedded control of a wide range of devices, such as electric motors, voltage regulators, office machines, appliances, implantable medical devices, etc.

An MCU includes a central processing unit (CPU), memory, and other components. Program memory stores a main program and a reset program (sometimes referred to as "boot code"). Program are typically stored in non-volatile flash memory.

A program includes a sequence of instructions that is derived by compiling a program written in human readable source code. On request, the CPU executes a program, instruction by instruction, until termination.

MCU program memory is organized into an array of addressable units. Instructions and data of a program are stored in addressable units of program memory. Each instruction or unit of data can be fetched from program memory at an address thereof.

SUMMARY OF THE INVENTION

A method and apparatus for microcontroller unit (MCU) memory relocation is disclosed. The MCU includes a central processing unit (CPU) and memory, but lacks a memory management unit (MMU). In one embodiment of the method, a first program is selected for execution by the CPU. The first program is one of a plurality of programs stored in the memory of the MCU. Each of the programs includes position dependent instructions or data. The programs are compiled from source code written in position dependent code.

BRIEF DESCRIPTION OF THE DRAWINGS

The present invention may be better understood in its numerous objects, features, and advantages made apparent to those skilled in the art by referencing the accompanying drawings.

FIG. 2 is a block diagram illustrating an example CPU coupled to memory via an address translation unit employing one embodiment of the present invention.

FIG. 3 is block diagrams illustrating one embodiment of the address translation unit of FIG. 2.

FIG. 5 is a graphical representation of a table stored in memory of the example MCU.

The use of the same reference symbols in different drawings indicates similar or identical items.

DETAILED DESCRIPTION

Figure 1:
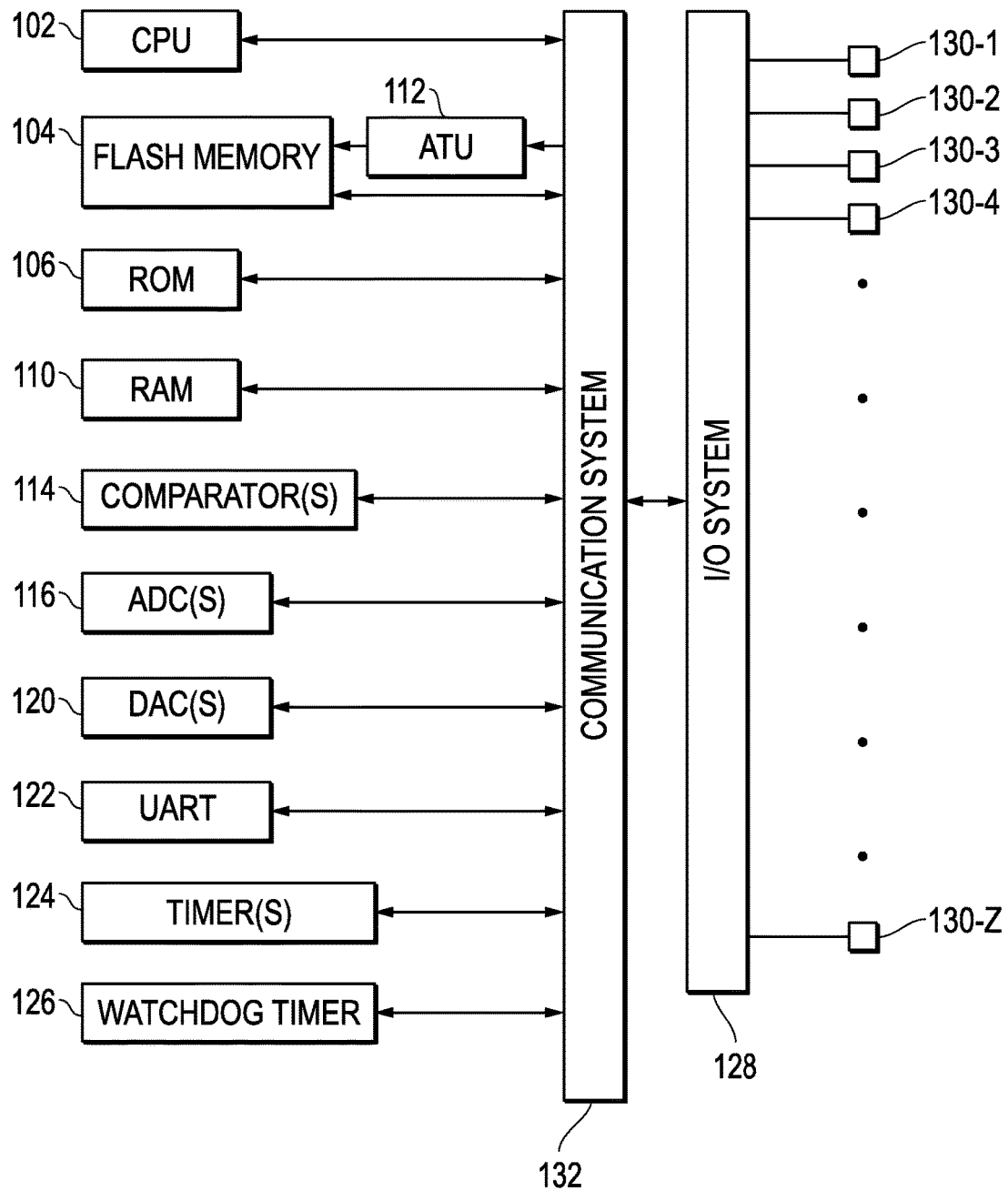
FIG. 1 is a block diagram illustrating an example MCU employing one embodiment of the present invention.

As noted above, an MCU includes a CPU, memory, and other components. The CPU includes a program counter with a program count (PC), which is a direct or indirect address for the next instruction of the program being executed. As soon as that instruction's execution starts, the PC is advanced, and it points to the next instruction to be executed. The PC need not advance in sequential order. The PC can jump forward or backwards in varying increments in accordance with the program being run.

A fair amount of initialization and housekeeping must done before the CPU runs a main program. Some very critical hardware may need to be initialized. Then some software initialization may need to happen, such as setting up a stack pointer and perhaps copying data from nonvolatile memory to volatile memory where it can be accessed and perhaps modified by the CPU. Initialization and housekeeping is performed in accordance with the reset program embedded in program memory. The CPU runs the reset program in response to activation of a reset signal. When the reset signal is activated, the CPU immediately sets its PC to a predetermined value such as 0x0000 (hexadecimal), which is the direct memory address of a "reset vector." The reset vector tells the CPU where the reset program can be found in memory. The CPU sets the PC to an address fetched from the reset vector. This fetched address is the address of the reset program.

At the end of the reset process, the PC is set to another predetermined address, which points to a memory location where the main program can be found. This address is fixed (doesn't change after the reset program is loaded into memory) and is known as the main program link address (hereinafter the link address or LKA). At the end of the reset process, the CPU begins executing whatever program is at the main program link address. To emphasize this point, two identical MCUs are loaded with distinct main programs that implement different functions. Both programs are stored in their respective MCUs at the same main program link address, e.g., 0xFFFE. After the reset process, the PC in each MCU is set to 0xFFFE, and the CPU in each MCU begins running its respective program located at 0xFFFE.

In general, programs are written in position independent code or position dependent code. Position independent code (PIC) uses relative addressing, while position dependent code (PDC) uses absolute addressing. To illustrate, an instruction in a PIC program might look like: "jump 585 bytes from the current position" or "jump 5745 bytes from the address where the program is stored in memory." In contrast, a similar instruction in a PDC program might look like "jump to address 0xF6F5."

Because PIC programs employ relative addressing, PIC programs can be loaded anywhere in memory and properly executed therefrom. In contrast a PDC program must be stored or loaded at a predetermined address (e.g., the main program link address) in order to run properly. PDC programs could be stored anywhere in memory if the absolute addresses of instructions or data are translated by a memory management unit (MMU). An MMU, sometimes called paged memory management unit (PMMU), is a hardware unit through which all memory addresses are passed, primarily performing the translation of virtual memory addresses to physical addresses. MMUs typically divide a virtual address space into pages, each having a size which is a power of 2, usually a few kilobytes, but they may be much larger. The bottom bits of the address (the offset within a page) are left unchanged. The upper address bits are the virtual page numbers. MMUs use an in-memory table of items called a "page table," containing one "page table entry" (PTE) per page, to map virtual page numbers to physical page numbers in memory.

Software developers prefer to write programs for MCUs using PDC for various reasons. Few if any MCUs, however, employ MMUs and virtualized addressing. At the end of the reset program, the PC is set to the link address, and the CPU begins executing whatever program is found there. As a result, the main program for MCU must be loaded into memory at the link address in order to run properly. Because memories in MCU have only single physical addresses (and no virtualized addressing), two main programs cannot be loaded at the same link address. This situation would prevent two versions of the same "main program" to be loaded into an MCU at a time.

The present invention relates to an apparatus and method that enables a main program written in PDC to be loaded into any program memory location and later executed from this memory location in proper fashion. As a result of employing the present invention, MCU memory can store multiple main programs written in PDC. This advantage and others will be more fully described below.

MCUs have distinct architectures. In general, however, an MCU contains a CPU and program memory for storing a reset program and at least one main program. The present invention will be described with respect to an MCU that lacks an MMU. FIG. 1 illustrates several components of an example MCU 100 that employs one embodiment of the present invention.

MCU 100 includes a CPU 102 that executes instructions of a reset program or a main program. Flash memory 104 stores several main programs written in PDC. The reset program can also be stored in flash memory 104. A computer system (not shown) can transmit main programs via a communications link to MCU 100 for subsequent storage in flash memory 104. MCU 100 also includes a small amount of RAM 110 that can be used by CPU 102 for storing temporary data. CPU 102 can access flash memory 104 to read program instructions or program data. RAM 110 includes general purpose registers, at least one of which can be used to store an address for data contained in a program.

MCU 100 includes an address translation unit (ATU) 112 that can translate a program count (PC) for program instructions as will be more fully described below. ATU 112 can also translate address for program data as will be more fully describe below. ATU 112 enables multiple main programs to be run from different locations in memory 104, even though each of the main programs are designed to operate from the same link address LKA.

MCU 100 includes one or more comparators 114, each of which is configured by CPU 102 to compare two input digital values. CPU 102 and comparators 114 are built to interpret or process digital data, and accordingly they are not able to do anything with analog signals received from, for example, devices external to MCU 100. ADCs 116 can convert analog signals into a form that CPU 102 or digital comparators 114 can recognize. MCU 100 also includes digital to analog converters (DACs 120), which allow MCU 100 to output analog signals for controlling devices external to the MCU.

A Universal Asynchronous Receiver/Transmitter (UART) block 122 makes it possible for MCU 100 to receive a new main program via a communication link with very little load on CPU 102. The new main program can be stored in flash memory 104. The UART or another component of MCU 100 is capable of asserting a reset signal after the UART receives a new maim program. The reset signal, when asserted, prompts the CPU 102 to initiate its reset program. As noted, one of several main programs stored in flash memory 104, including the new main program, is selected during the reset process for subsequent execution.

MCU 100 includes timer channels 124. Timer channels are circuits that include one or more functional units such as compare/capture units, pulse-width modulation (PWM) units, etc. Not all timer channels of an MCU are identical. Some timer channels of an MCU may include only compare/capture units, while other timer channels of the MCU include only PWM units. Still other timer channels of the MCU may contain both compare/capture units and PWM units and other functional units. Timer channels usually contain at least one n-bit counter register (hereinafter counter register), which stores an n-bit counter value (hereinafter counter value). Counter registers count pulses of a clock signal or pulses of an event signal. In other words, a counter register may increment or decrement its counter value with each pulse of a clock signal or each pulse of an event signal. For most counter registers, the counter value overflows to zero after it reaches its maximum value. Clock pulses are typically produced by a clock generator that is internal or external to the MCU. Scalar units in timer channels may adjust the frequency of the clock signal. Event pulses are generated by devices that are internal or external to the MCU. Event pulses are generated with corresponding events. For example, a comparator internal to an MCU may generate an event pulse when the comparator detects equality between two input values. Or, an MCU may receive an event pulse generated by a magnetic sensor of an external device when the sensor detects a magnetic field of certain strength.

Watchdog timer channel 126 is a special timer channel that is used to detect and recover from MCU malfunctions. Watchdog timer channel 126 includes at least one counter register, which counts pulses of a clock signal. During normal operation, the CPU 102 regularly restarts the watchdog counter value to prevent it from reaching its maximum value. If, due to a hardware fault or program error, CPU 102 fails to restart the watchdog counter value, the watchdog timer channel 126 will assert the reset signal, which prompts the CPU 102 to initiate its reset program.

With continuing reference to FIG. 1, MCU 100 includes an event link controller (ELC) 128. ELC 128 receives internally generated event signals IE1-IEM from components such as comparators 114, ADCs 116, timer channels 124, etc., via a communication system. ELC 128 can be configured by CPU 102 to select a subset E1-EN of the internally generated event signals IE1-IEM for transmission to one or more components via the communication system.

I/O system 128 contains I/O pins 130, some of which can be configured by CPU 102 to an input state or an output state. When I/O pins are in the input state, they are often used to read signals generated by devices external to the MCU 100. An I/O pin 130 configured in the input state will be referred to herein as an input pin 130. I/O pin 130-1 is configured as an input pin, and configured to receive an externally generated reset signal. When a device external to MCU 100 asserts the reset signal at pin 130-1, the CPU 102 initiates its reset program. In the output state, I/O pins 130 can drive devices external to the MCU 100.

An I/O pin 130 configured in the output state will be referred to herein as an output pin 130. Components 102-130 are in data communication with each other via a communication system 132. Although not shown, the communication system may 132 take form in one or more buses, signal lines and other devices that are configured to transmit control values, data, signals, addresses, instructions, etc.

With continuing reference to FIG. 1, FIG. 2 illustrates one embodiment of CPU 102 in data communication with program memory 202 and ATU 112. In the embodiment shown, program memory 202 is a logical presentation of flash memory 104. Program memory 202 is organized into an array of addressable units. Data and instructions of a program are stored in addressable units of memory. Accordingly, each data unit instruction can be fetched from a corresponding address in memory 202.

FIG. 2 shows organization of memory 202. In particular, a reset vector is stored at address 0x0000. The reset vector points to the reset program loaded at address RSLA. Individual main programs P1-P4 are loaded at addresses P1LA-P4LA, respectively. In one embodiment load address P1LA and link address LKA are identical. In another embodiment, LKA is outside the memory space of program memory 202. It is also noted that each of the programs P1-P4 are written in PDC with the assumption that each will be loaded in memory at link address LKA. In other words, when P1-P4 were developed there was no special consideration to not being run from link address LKA.

CPU 102 includes an arithmetic logic unit (ALU) 204 coupled to an instruction decoder 206, program counter 210 and control logic 212. Instruction decoder 206 and control logic 212 decodes and carries out instructions fetched from memory 202. ALU 204 performs arithmetic and logic operations on the data contained in registers (not shown). ALU 204 is the heart of the CPU 102. Program counter 210 maintains the PC, which is the direct or indirect address of the next instruction to be fetched and executed. Once the instruction is executed, the PC is advanced. CPU 102 can write data addresses (DAs) in a general purpose register of RAM 110. These addresses point to data contained in a program. Although the figures show CPU 102 and ATU 112 as separate units, in an alternative embodiment, ATU 112 may be a subunit of CPU 102.

The PC is a direct or indirect address for the next instruction to be executed. DA is a direct or indirect address for data of a program in flash memory 104. In one embodiment, PC or DA is deemed indirect if it is contained in a specific range of addresses. For example, the PC or DA is an indirect address if certain bits (e.g., the 9 most significant bits) equate to a predetermined binary value (e.g., 000000100 binary). If indirect, ATU 112 translates the PC or DA into a direct address. After the instruction corresponding to the PC is fetched and executed, the PC advances in accordance with the program (e.g., reset program or main program) being executed. After data corresponding to DA is fetched and processed, CPU 102 can change the value of DA in the GPR.

Regardless of whether the PC or DA is translated, ATU 112 outputs a direct or physical address PA for the next instruction or program data. If the PC is determined to be a direct address, PA=PC. If PC is determined to be indirect, PA=f(PC). Stated differently, if PC is determined to be indirect, PA is generated as a function of PC. Similarly, If the DA is determined to be a direct address, PA=DA. If DA is determined to be indirect, PA=f(DA). In one embodiment, PA can be generated by adding an address offset AO of m bits to PC or DA. The m bits of AO can be added to the least significant m bits of PC or DA, or the middle m bits of PC or DA. In another embodiment, PA can be generated by adding the address offset AO to PC or DA, and then replacing the upper y bits (e.g., 9 bits) of the result with a predetermined binary value (e.g., 000000000 binary). This later embodiment can be used when the link address LKA is outside the range of address space for memory 202. Regardless of whether PC or DA is a direct or indirect address, the instruction corresponding to the PC or the data corresponding to the DA is fetched from memory 202. As will be more fully described below, CPU 102 selects AO from a candidate list of AOs during the reset process. CPU 102 selects the AO after the CPU 102 selects one of the main programs P1-P4 for subsequent execution.

FIG. 3 illustrates relevant components of an example ATU 112 in block diagram form. ATU 112 includes an AO register 302 that receives and stores an m bit AO selected by CPU 102 during the reset process, as will be more fully described below. ATU 112 also includes a range register that receives and stores a y bit range value R. A compare circuit 310 uses R to determine if the PC or DA is a direct or indirect address. In one embodiment, if the most significant y bits of the PC or DA equates with R, the PC or DA is an indirect address that should be translated. For example, with R=000000100 (binary) all PCs or DAs that begin with 000000100 (binary) are indirect addresses.

Adder 306 receives the offset AO and PC or DA, which has n bits. AO has m bits, which is less than n. Adder 306 generates a translated PC (TPC) or translated DA (TDA) having n bits. Adder 306 generates TPC or TDA by adding the m bits of AO to the least significant m bits of the PC or DA in the illustrated embodiment. For example, with AO=4422380 (hexadecimal) and PC=2001000 (hexadecimal), AO+PC=TPC=2423380 (hexadecimal). In another embodiment, the m bits of AO are added to the middle m bits of the PC or DA. In still another embodiment in which the link address LKA for the program being executed is outside the address space for memory 202, an additional circuit is interposed between adder 306 and the input of selector 312. This added circuit sets the most significant z bits of TPC or TDA to a predetermined value (e.g., 000000000 binary). However, for the purposes of explanation only, the present invention will be described with no added circuit, so that the output TPC or TDA of adder 306 provided directly to selector 312 as one input. The PC or DA is provided to selector circuit 312 as the other input. Selector 312 selects either PC or TPC as the PA for the next instruction to be executed by CPU 102, or selector 312 selects either DA or TDA as the next PA for data from memory 202. The selection is based on the comparison performed by compare circuit 304. If compare circuit 310 detects equality between R and the most significant y bits of PC or DA, PC or DA is an indirect address, and selector 312 selects TPC or TDA as the PA for the next instruction or data. If compare circuit 310 does not detect equality between R and the y bits of PC or DA, PC or DA is a direct address, and selector 312 selects PC or DA as the PA for the next instruction or data.

Figure 4:
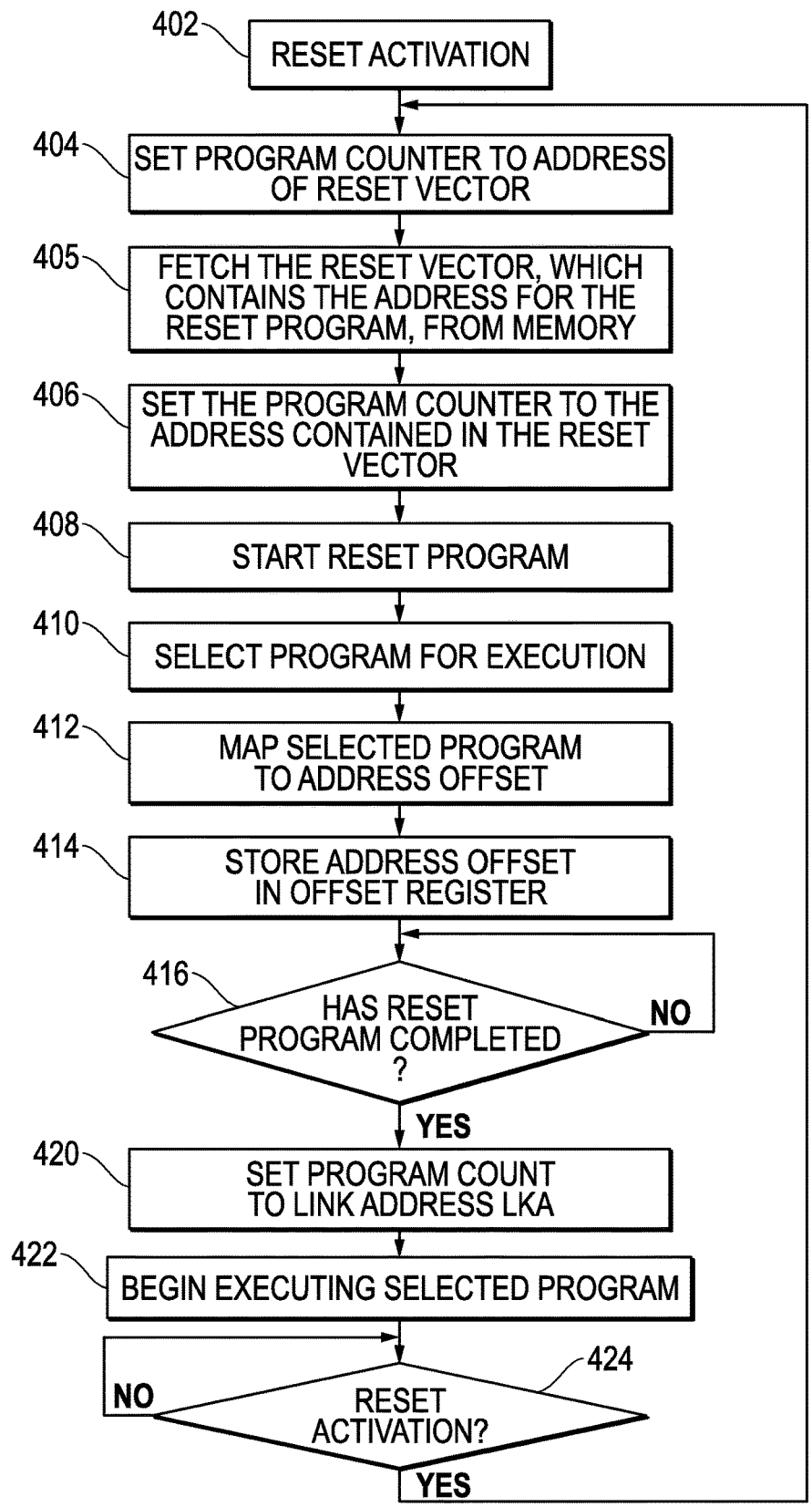
FIG. 4 is a flow chart illustrating operational aspects of the CPU and address translation unit of FIGS. 2 and 3.
Figure 6:
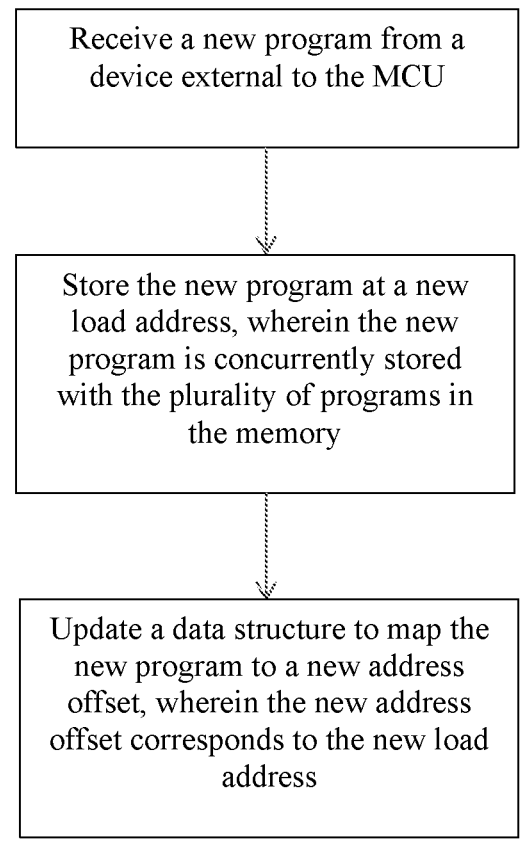
FIG. 6 illustrates relevant aspects of a process.

CPU 102 can receive an activated reset signal from any one of many different sources such as watchdog timer 126 or input 130-1. In response to receiving this activated reset signal, CPU 102 executes its reset program. During the reset process, CPU 102 selects one of the main programs P1-P4 for subsequent execution. FIG. 4 is a flow chart illustrating relevant aspects of a process implemented by CPU 102 in response to activation of the reset signal.

The process shown in FIG. 4 begins with activation of the reset signal. In step 404, CPU 102 sets its PC to a predetermined address associated with the reset vector. For the purposes of explanation, the predetermined address is 0x0000 (hexadecimal). Presuming R in register 304 is set to 000000100 (binary), PC=0x0000 is determined by compare circuit 310 to be a direct address. As a result, selector 312 selects PC=0x0000 as the PA for the reset vector, regardless of the TPC that is generated by adder 306. The reset vector, which contains the load address of the reset program, is fetched from memory 202. In response to CPU 102 receiving the reset vector, CPU 102 sets its PC to RSLA, the load address of the reset vector, in step 406. In step 408, execution of the reset program is started. RSLA and all addresses for instructions or data of the reset program are direct addresses (i.e., the 9 most significant bits are not set to 000000100 binary). As a result selector 312 selects PC or DA as the PA for all instructions or data of the reset program.

During the reset process, CPU 102 selects one of the main programs P1-P4 for subsequent execution as shown in step 410. The selection can be based on any one of a number of factors. For example, if the reset program was activated because a new program Pnew was loaded into memory 202, CPU 202 will select Pnew. In another embodiment, CPU 102 may maintain historical performance data (not shown) about each of the programs P1-P4. For example, CPU 102 may count and store the number of times the execution of a program results in malfunction. From this information, CPU 102 may select the program that malfunctioned the least. In another embodiment, CPU 102 may select one of the programs P1-P4 based on the time of day, day of the week, or day of the year. In an alternative embodiment, CPU 102 may receive an instruction from an external device prior to the reset process. This instruction may identify the program to be executed on the next reset process. Additional or alternative program selection criteria can be written into the reset program.

Although not shown in the figures, a header for each main program P1-P4 is created in memory 202 upon download. Each header can include an identification Px of its corresponding main program, where x is an integer. Additional information may be included in the header. For example, the header may include the length of the main program Px, version number of main program, load address PxLA in memory 202 of Px, and an address offset AOx calculated as a function of the load address PxLA and the link address LKA, etc. In one embodiment, AOx may be calculated by subtracting the link address LKA from the load address PxLA. In the embodiment shown, AO1 should be P1LA−LKA=0x0000 (hexadecimal), AO2 should be P1LA-LKA, etc. During the reset process, CPU 102 may scan memory 202 for program headers and extract relevant information therefrom. For example, CPU 102 may scan the program headers for program identifications and corresponding address offsets. Once identified, these values can be mapped in a table (not shown) in memory 202. FIG. 5 illustrates an example table that links or maps address offsets AOs to program identifications. During the reset process, CPU 102 may access this table and select a program for execution at step 410 in accordance with a selection criteria described above.

Once a main program is selected, CPU 102 accesses the table shown in FIG. 5 and maps the selected program to its corresponding address offset AO. CPU 102 stores this address offset AO in the offset register 302 as shown in step 414. For the ease of illustration, program P3 is selected for execution, and as a result CPU 102 stores AO3 in register 302. The reset program continues initializing CPU 102 in accordance with instructions of the reset program. At the end of the reset process, CPU 102 sets its PC to link address LKA.

Link address LKA is within the range of addresses defined by R. As such LKA is an indirect address. ATU 112 will translate LKA. Specifically, selector 312 will not select PC=LKA as the PA for the first instruction of P3. Rather selector 312 will select TPC=LKA+P3AO as the PA, and CPU 102 will begin executing instructions in memory 202 beginning at LKA+P3AO. Thereafter PC will advance its PC after the instruction is executed. For example, CPU 102 may set PC=PC+2. This new PC, and all subsequent PC values, should fall within the range of addresses defined by R. Accordingly, PC is continuously translated during execution of P3. In other words, selector 312 will select TPC as the PA for all instructions of P3. CPU 102 will continue to run P3, the selected program in the illustrated example, until the reset signal is activated in step 424.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
   a microcontroller unit (MCU) wherein the MCU is an integrated circuit that comprises:
   a central processing unit (CPU);
   a memory storing a plurality of programs that are executable by the CPU;
   an address translation unit for selectively translating addresses generated by the CPU;
   wherein each of the programs comprises position dependent instructions, and
   wherein the MCU further comprises a reset program stored in the memory, and
   wherein the reset program is executable by the CPU in response to assertion of a reset signal, wherein the CPU selects a first of the programs for execution by the CPU in response to executing the reset program, and
   wherein the address translation unit comprises an adder and memory for storing an address offset, wherein the adder is configured to add the address offset to addresses generated by the CPU, and
   wherein the address translation unit comprises a comparator for comparing the X most significant bits of addresses generated by the CPU with X predetermined bits, wherein the adder is configured to generate a translated address by adding the address offset to an address generated by the CPU, wherein the address translation unit comprises a selector for selecting the address generated by the CPU or the translated address, wherein the selector selects the translated address when the X most significant bits of the address generated by the CPU compares equally with the X predetermined bits, and wherein the selector selects the address generated by the CPU when the X most significant bits of the address generated by the CPU does not compare equally with the X predetermined bits.

2. The apparatus of claim 1 wherein the CPU is configured to select the address offset from among a plurality of address offsets that correspond to the programs, respectively.

3. The apparatus of claim 2 wherein the CPU is configured to calculate the address offsets as a function of respective load addresses of the programs, respectively, in the memory, and a link address.

* * * * *